United States Patent [19]
Michael

[11] Patent Number: 4,787,769
[45] Date of Patent: Nov. 29, 1988

[54] CONNECTING ELEMENT

[75] Inventor: Roy Michael, Cologne, Fed. Rep. of Germany

[73] Assignee: Exibelco GmbH, Basel, Switzerland

[21] Appl. No.: 943,266

[22] PCT Filed: Mar. 16, 1985

[86] PCT No.: PCT/EP85/00108

§ 371 Date: Apr. 15, 1987

§ 102(e) Date: Apr. 15, 1987

[87] PCT Pub. No.: WO85/04220

PCT Pub. Date: Sep. 26, 1985

[30] Foreign Application Priority Data

Mar. 19, 1984 [DE] Fed. Rep. of Germany ....... 3409983

[51] Int. Cl.[4] ............................................... B25G 3/00
[52] U.S. Cl. ................................... 403/252; 403/255; 403/322
[58] Field of Search ................. 403/322, 252, 254, 255

[56] References Cited

U.S. PATENT DOCUMENTS 4,455,103 6/1984 Hackenberg ..................... 403/322
4,641,983 2/1987 Strassle .......................... 403/255

FOREIGN PATENT DOCUMENTS 0000525 2/1979 European Pat. Off. .
0059463 9/1982 European Pat. Off. .
1775802 8/1971 Fed. Rep. of Germany .
2603228 1/1977 Fed. Rep. of Germany ...... 403/252
2556235 6/1977 Fed. Rep. of Germany .
3128595 2/1983 Fed. Rep. of Germany .
2152941 4/1973 France .

Primary Examiner—Andrew V. Kundrat
Attorney, Agent, or Firm—Wenderoth, Lind & Ponack

[57] ABSTRACT

A connecting element for the releasable connection of two structural parts of a stand, in particular a support section and a frame section, includes a housing and at least one locking element. An eccentric is rotatably supported in the housing locking element is guided longitudinally in the housing and has a clamping portion protruding from the housing to be introduced in an undercut groove of the support section and clamped therein. An eccentric head (76) of the may be locked in a bore hole of the frame section. The clamping portion of the locking element may be rotated within a limited angular range. The locking element is connected displaceably by a pulling element with the eccentric the clamping portion is a transverse bar.

27 Claims, 7 Drawing Sheets

Fig. 1
Fig. 2
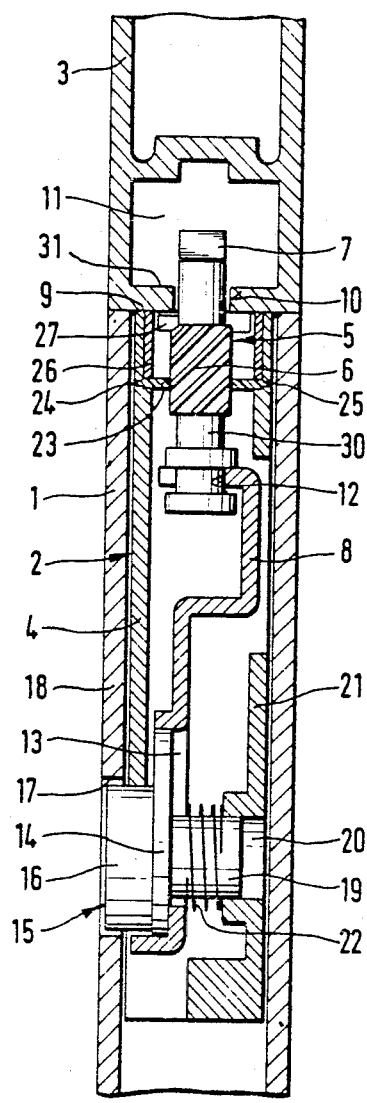
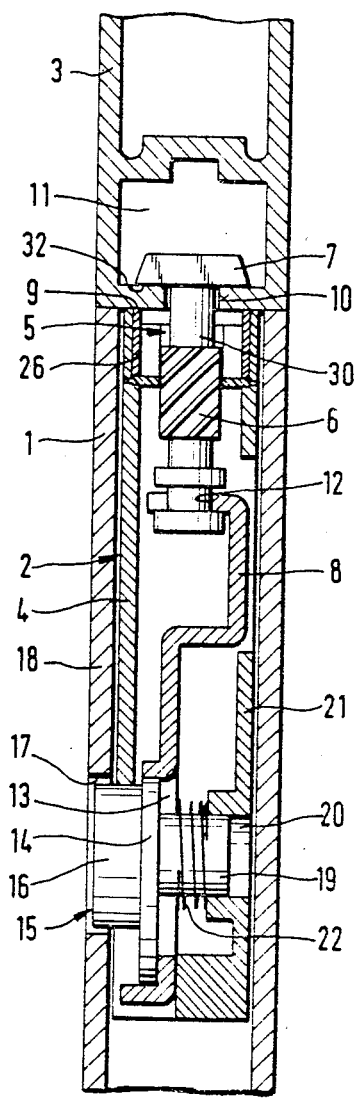

CONNECTING ELEMENT

BACKGROUND OF THE INVENTION

The invention relates to a connecting element for the releasable connection of two structural parts of stands, in particular a support section and a frame section, wherein the connecting element is mounted stationarily in a hollow frame section and comprises a housing having therein at least one locking element, whereby the connecting element and thus the frame section may be connected releasably with the support section. In the housing of the connecting element an eccentric is rotatingly supported, whereby the locking element is guided in a longitudinally mobile manner in the housing and whereby a structural part protruding from the front side of the housing of the locking element may be introduced into an undercut groove of the support section and tightly clamped therein. An eccentric head of the eccentric is insertable into the housing and may be locked in a bore hole of the frame section.

Connecting elements of this type are known in numerous configurations and are used in particular for the joining of support sections and frame sections, whereby structures such as, exhibition stands are erected. This connection should be extremely strong, but also readily produceable and releasable.

A connecting element of this generic type is known from DE-OS No. 31 28 595, corresponding to U.S. Pat. No. 4,455,103. This connecting element consists of a bearing housing with a rising wedge surface and a locking element contained therein in a longitudinally displaceable manner and in the form of a strip of sheet metal and provided with a counter bevel pressed by the force of a spring against the wedge surface. By means of an eccentric the locking element in the form of a sheet metal strip may be moved longitudinally, whereby a joining hook on the end side of the locking element is displaceable both longitudinally and, by motion of the counter bevel on the wedge surface, also transversely. A spring tongue is cut from metal strip and bent down, with the end of such tongue being supported on an inner wall of the bearing housing and longitudinally guided thereon. The wedge surface extends between two joining projections and is overlapped by a bend of the holding element, which secures the eccentric bolt in a rear wall recess of the bearing housing.

A connecting element of this type is not only difficult to assemble, but there are considerable difficulties involved in its application, since if the locking element is tightened severely by means of the eccentric, the holding element loses contact with the wedge surface and the connection may be released. In addition, if the connecting element is stressed strongly as the result of the one-sided pressing of the joining hook on the undercut groove of the support section, the connecting element may be tilted, leading to problems in the assembly of, for example, an exhibition booth and in case of a heavy load the connection may be released unintentionally.

SUMMARY OF THE INVENTION

It is therefore the object of the invention to provide a connecting element of the abovementioned type, whereby a releasable connection capable of supporting a heavy load of two structural parts of a stand may be established and wherein the connecting elements have the dimensions of the known connecting elements and are readily assembled.

This object is attained according to the invention in that a structural part protruding from a housing of the locking element is capable of rotation around its longitudinal axis within a limited angular range, that the locking element is connected in a mobile manner by means of a tension or pulling element with an eccentric and that the free end of the projecting structural part terminates in a stay such as a transverse bar. In the case of a connecting element of this type the two structural parts of the stand are joined together exclusively by longitudinal and rotating movement of the locking element and it is no longer necessary to force it out of such longitudinal movement, which is effected in known connecting elements either by the aforedescribed wedge surfaces or by means of additional spring elements. Any tilting or the like is thereby excluded, so that secure abutting of the locking element against the surface of an undercut groove of one of the structural parts of the stand is assured.

In a further development of the concept of the invention, the end of the housing side of the protruding structural part of the locking element is joined fixedly to a guide rod rotatable in a controlled manner around its longitudinal axis and connected at its other end with the tension element. Very heavy connecting elements may be produced by this arrangement.

In a particularly light-weight embodiment of the invention the locking element comprises in its center region a twisted portion that extends through a slit-like opening in the front side of the housing. If this locking element is moved by the eccentric in its longitudinal direction, it is necessarily caused to perform a rotating motion around its longitudinal axis. The stay of the locking element thereby engages a surface formed in the undercut groove of the support section.

The connecting element according to the invention may be assembled in a particularly simple manner when its housing is in two parts, i.e. a base portion and a cover.

The connecting element is very light in weight and simple to produce if the housing is made of a plastic, which is particularly advantageous in view of mass production. In case of a two-part housing, it is already a considerable advantage if the at least the base portion is plastic.

In particular in the light-weight embodiment of the connecting element according to the invention the cover of the two-part housing overlaps the front side of the housing and has a guide slit for the locking element. In this manner, the connecting element may be manufactured with very few individual parts.

The connection of the locking element with the pulling element is established according to the invention by that the locking element is angled at its end facing away from the stay in order to engage a seat in the tension element. This mobile joint or connection prevents tilting of the locking element in the housing and also facilitates mounting of the locking element.

In a further development of the concept of the invention two or more locking elements may be provided in the connecting element and joined with the eccentric by means of a single pulling element. An even stronger tensile force and holding capacity of the connecting element may be obtained thereby.

According to a preferred embodiment of the invention, the guidance of the guide rod is effected on its circumferential surface. Since guide means are readily applied directly to the housing, no additional structural parts are required for the purpose of guiding, whereby the production of the connecting element is facilitated and its load bearing capacity correspondingly increased.

It has been found to be especially convenient to provide a drill-like rod or twisting rod i.e. a rod caused to rotate about its axis upon longitudinal movement thereof, for the control of the guide rod. It is possible thereby to effect a controlled motion in a technically simple manner, without the need for expensive control mechanisms. The guidance of the guide rod becomes particularly simple if the drill-like rod consists of a twisted square metal plate. But it may also consist of a square steel bar, a round bar having guide grooves milled or cut therein, or any other drill-like rod.

In order that the drill-like rod may be guided without twisting, in the light-weight embodiment of the invention the guide means for the drill-like rod is mounted fixedly on the housing. In a heavy embodiment of the invention the guide of the drill-like rod is a sheet metal structure comprising at least two guide members on the peripheral surface of the guide for the drill-like rod. It has been found extremely convenient to provide the drill-like rod guide in the form of a guide plate inserted into a guide body provided in the housing and penetrated by one or several of the locking elements. The connecting element may thereby be largely preassembled outside the housing.

To place the drill-like twisting rod in position without great frictional resistance, it has been determined that a sheet metal guide plate should have a thickness of less than 2 mm. A thickness of the guide plate of less than 0.5 mm has been found to be particularly advantageous.

In order to maintain the guide body securely in the housing, while rendering replacements easy, according to a further embodiment of the invention locking means, in particular a plurality of clips, are provided on the lateral walls of the guide body, which clips engage corresponding grooves in the housing.

To limit the path of displacement of the guide rod, in a further embodiment of the invention at least one stop is provided in or on the housing to limit the rotating motion of the guide rod. Conveniently, a stop bush sleeve may be arranged in the housing to abut against a counter stop on the guide rod. The stop sleeve may be mounted in a particularly simple manner if it is merely necessary to insert it from the front side into the housing. The counter stop may be a flattened portion of the guide rod in an advantageous arrangement.

The stop to limit the rotating movement of the guide rod according to the invention also may be located in the area of the seat for the hooking of the locking element onto the pulling element and may abut against a counter stop on the guide rod. The stop provided on the housing may be of a single piece with the housing. No additional stop would therefore be required.

A particularly secure connection is obtained according to the invention in that the stay or stays are double-headed (hammer head). Connecting elements with a hammer head engaging behind part of another structural part are known, for example from DE-OS No. 26 03 228. In these connecting elements a spring loaded bolt set in an insert is provided, such bolt having a conical hole transverse to its longitudinal axis and cooperating with a screw located offset with respect to the axis of the conical hole and having a conical point. The bolt carries the hammer head that engages through a slit in one part.

The production and load bearing capacity of the connecting element according to the invention is significantly facilitated and enlarged in that, in keeping with a further embodiment of the protruding structural part, the rotatable guide rod and the drill-like rod are of a single piece.

To protect the protruding structural part or parts on the front side of the housing two ledges or a ledge shaped strap are conveniently provided.

Advantageously, the eccentric penetrates the tension element at its end facing away from the locking element. The eccentric head is appropriately maintained by a compression spring in its locking position in a bore of the frame section.

In order to create a controlled connection, in a further development of the concept of the invention the stay or stays of the heavy configuration is or are rotated through 90° transversely to the undercut groove in the support section and abut against the inner surfaces of the undercuts. In the light-weight configuration of the invention the stay is rotated, upon execution of a half stroke, by approximately 30° transversely to the undercut groove in the support section and is then abutting against the inner surface of the undercuts.

In order to obtain a positive locking connection by means of the connecting element, according to a still further embodiment of the invention, knurls or diagonal knurls are provided on the surfaces of the stays facing the housing. In the light-weight configuration of the invention the surfaces of the stay facing the housing are slightly bevelled or toothed. The surfaces formed in this manner abut against the undercuts of the other structural part of the stand and yield an even more secure hold.

BRIEF DESCRIPTION OF THE DRAWINGS

Three embodiments of the invention are described hereinbelow, with reference to the drawings.

In the drawings:

FIG. 1 shows in a partial section a lateral elevation of a connecting element set into a frame section in a released position, FIG. 2 is a lateral elevation corresponding to FIG. 1, wherein the connecting element is tightened, thereby establishing a connection between the frame section and a support section.

DETAILED DESCRIPTION OF THE INVENTION

Figure 3:
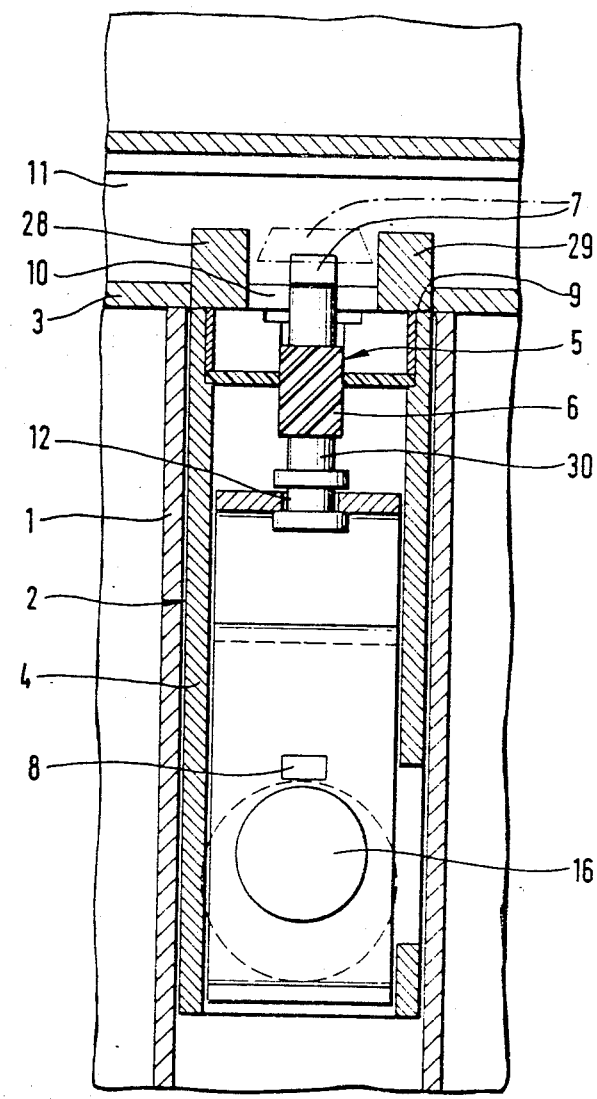
FIG. 3 is a front elevation in partial section of the connecting element in the position shown in FIG. 2.

FIGS. 1 to 3 show a frame section or member 1 in the form of a hollow shape into which a connecting element 2 is inserted, whereby the frame section 1 may be connected with a support section or member 3. The connecting element 2 consists of a housing 4 in which a locking element 5 is located in a longitudinally displaceable manner. The locking element 5 consists of a drill-like rod 6 having external helical guide grooves. On one end locking element 5 carries a stay 7, in the form of a transverse bar, and onto the other end thereof a tension or pulling element 8 is hooked.

The stay 7 protrudes from a front side 9 of the housing 4 and is introduced into an opening 10 in the support section 3, and in the case of a connection, as shown in FIGS. 2 and 3, engages against a surface 31 of an undercut groove or recess 11 of the support section 3. A seat 12 is provided on the pulling element 8 for the attachment thereto of the locking element 5. At its opposite end the pulling element 8 has a recess 13, the edge of which is engaged by an eccentric disk 14 of an eccentric 15. An eccentric head 16 of the eccentric 15 protrudes by the approximate thickness of the wall 18 of the frame section 1 from the connecting element 2, in order to engage a bore hole 17 in the side wall 18 of the frame section 1 and thereby to maintain the connecting element in an immobile position. A bearing journal 19, that is integral with the eccentric disk 14 of the eccentric 15, is guided in a bearing opening 20 in an opposite side wall 21 of the connecting element 2. A compression spring 22 arranged around the bearing journal 19 makes it possible to insert the eccentric 15 in the manner of a push button into the housing, so that in the initial position the eccentric head 16 of the eccentric 15 is locked in the bore hole 17 in the frame section 1.

An approximately 0.5 mm thick guide plate 23 is provided for the guidance of the drill-like rod 6 in the housing 4, guide plate 23 being in the form of a sheet metal part and having two guide pins 24, 25 on opposite locations of its circumferential surface. The guide pins 24 and 25 immobilize the guide plate 23 intended to guide the drill-like rod, in the housing 4. The guide pins 24 and 25 are of a single piece with the guide plate 23. A stop sleeve 26 abuts against the guide plate 23, sleeve 26 being inserted from the front side or end face into the housing 4 and serving to limit the path of displacement of the locking element 5 and thus the rotating motion of the drill-like rod 6. A counter stop 27 formed on a guide rod 30 of the locking element 5 abuts against the stop sleeve 26, counter stop 27 being produced in a simple manner by a flattening or portion of the guide rod 30.

To prevent damage to the stay 7, ledges or webs 28 and 29 are provided on the front end 9 of the housing 4.

The mode of operation of the connecting element 2 in the joining of two structural parts of a stand is as follows.

The connecting element 2 is inserted into frame section 1 until the eccentric head 16 of the eccentric 15, e.g. equipped with an internal hexagon, is locking into the bore 17 in the frame section 1. In the released state shown in FIG. 1, the hammer-shaped stay 7 is parallel to the width of the connecting element 2, wherein it is protected against damage by the ledges 28 and 29 (dashed lines in FIG. 3).

Following the insertion of the connecting element 2 into frame section 1, the unit is applied to support section 3, initially by inserting the stay 7 through the opening 10 into the support section 3. The eccentric 15 is then rotated by means of a suitable wrench. The tension element 8 is thereupon drawn or moved downwardly within the housing 4.

As the stay 7 is fixedly connected with the drill-like rod 6, the stay 7, on execution of a half stroke, rotates through 90° (approximately one-fourth of a rotation of the eccentric) transversely in relation to the undercut groove 11 in the support section 3, and a surface 32 or stay 7 abuts against the inner surface 31 of the undercut. In order to obtain an assured position of the stay 7, stops are provided in the housing 4 and on the locking element 5 itself. In the embodiment shown these stops are formed by flattened counterstops 27 of the guide rod 30. The locking element 5 remains in its locked position due to the clamping of the eccentric 15. If the eccentric is released, the stay 7 is disengaged from the undercut of the support section 3.

Locking without tilting may also be obtained by a double headed configuration of the stay. The locking element 5 consisting of the stay 7, the guide rod 30 and the drill-like rod 6, is a single piece element in the embodiment shown. This increases the load bearing capacity and facilitates the assembly of the connecting element 2.

Figure 4:
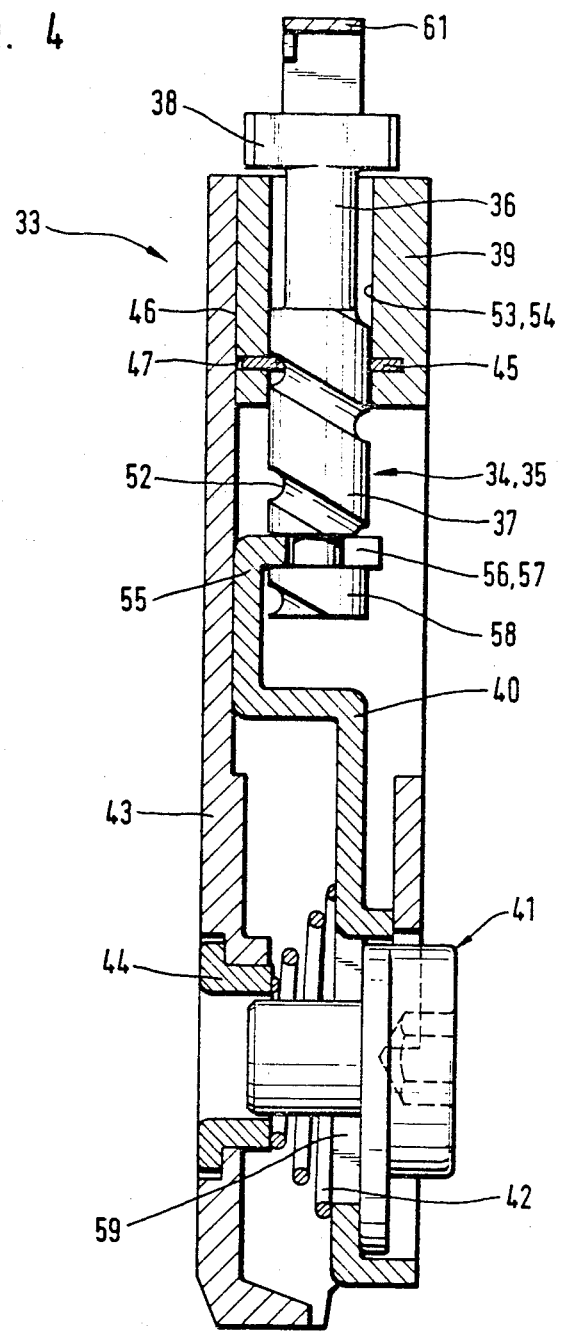
FIG. 4 is a lateral elevation of a second embodiment of a connecting element, shown partially in section similar to FIG. 2.
Figure 5:
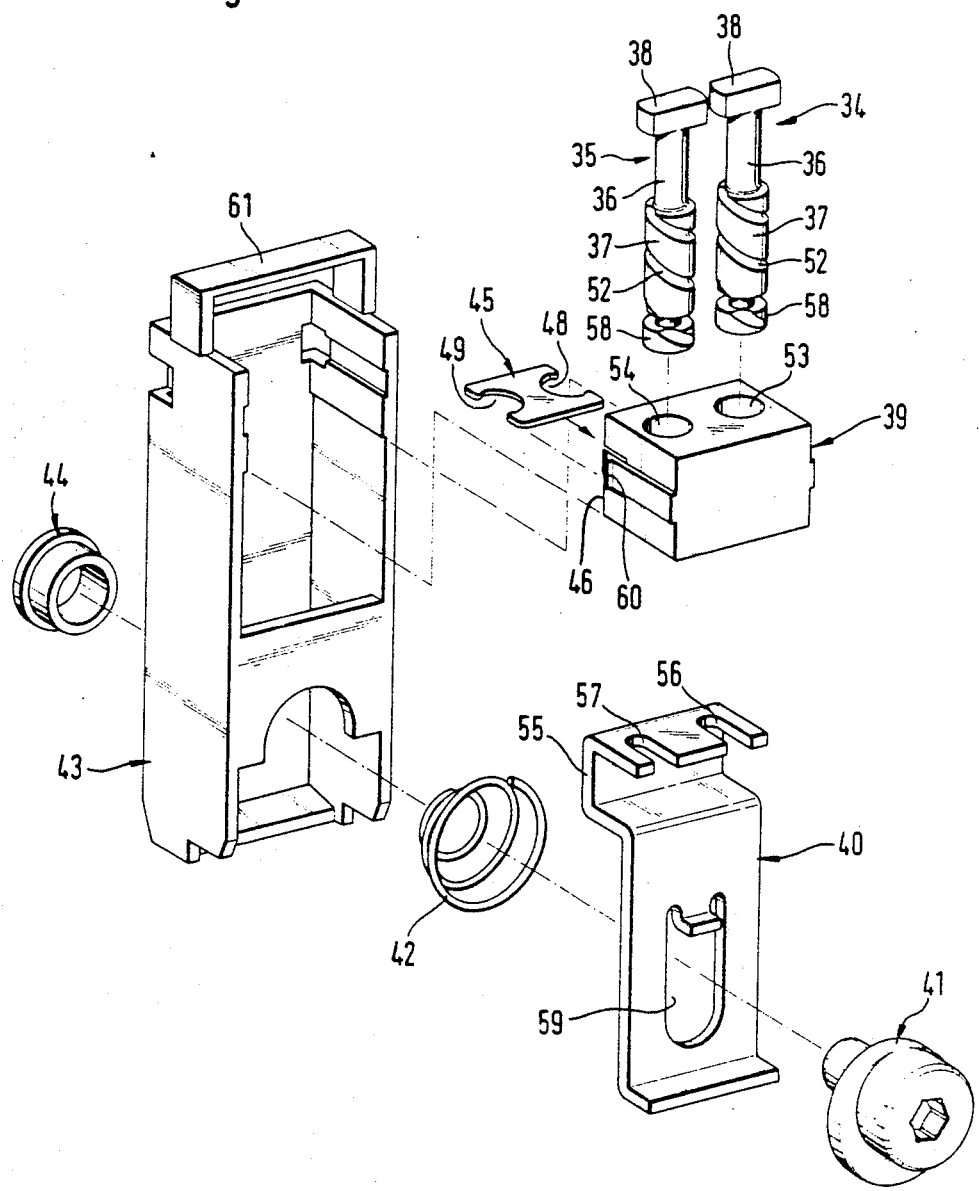
FIG. 5 is an exploded perspective view of the connecting element shown in FIG. 4.
Figure 6:
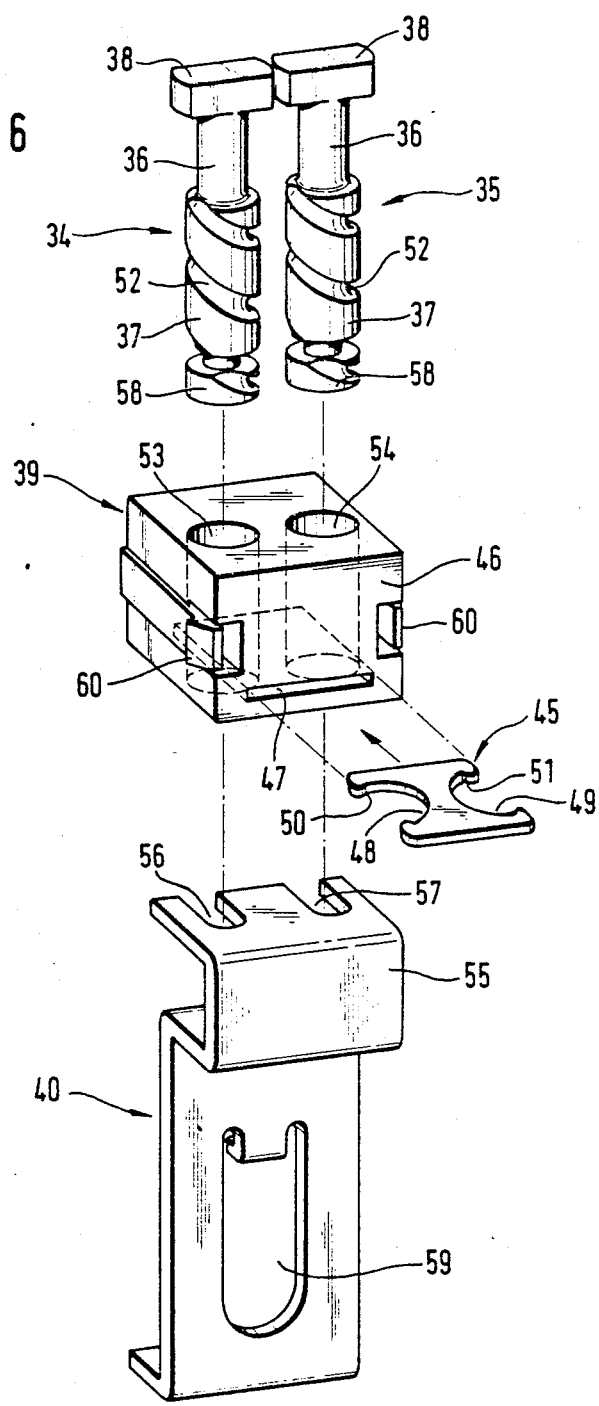
FIG. 6 is an enlarged exploded perspective view of a detail of the connecting element of FIG. 5.

A further possibility of increasing the forces that a connecting element is capable of absorbing is demonstrated by the second embodiment of a connecting element shown in FIGS. 4 to 6. This connecting element 33 comprises, in place of a single locking element, two identical locking elements 34 and 35. Each of these locking elements 34 and 35 consists of a guide rod 36, a drill-like rod 37 and a hammer-shaped stay or transverse bar 38. The locking elements 34 and 35 are connected by means of a guide body 39 with a single pulling element 40, which in turn is connected with an eccentric 41.

The eccentric 41 corresponds to the eccentric 15 of the example of embodiment of FIGS. 1 to 3, and is held in the same manner by a compression spring 42 in a push button-like manner in a housing 43. A bearing bush 44 is provided to support the eccentric 41 in the housing 43.

To guide the locking elements 34 and 35, a guide plate 45 is set into the guide body 39 located in the housing. To illustrate this condition, in FIG. 6 this part of the connecting element 33 is shown enlarged. The guide body 39 has a slit-like recess 47 in one side wall 46 to receive the guide plate 45. The guide plate 45, which has a thickness of about 0.5 mm, has in opposite sides thereof two essentially semicircular recesses 48 and 49, the edges 51 of which engage helical guide grooves 52 in the twisting rods 37, thereby providing guidance for causing the drill-like rods 37 to rotate during longitudinal movement thereof.

As a guide for the locking elements 34, 35 in the guide body 39, two vertical, circular passage openings 53 and 54 are provided therein. Following the insertion of the locking elements 34 and 35 into the passages 53 and 54, the tension element 40 is conencted with the locking elements 34, 35. For this purpose, an angular upper end of the pulling element 40 has two recesses 56 and 57, into which T-shaped lower ends 58 of the guide rods 36 are hooked.

At its other end the pulling element 40 has an elongated recess 59, through which passes the eccentric disk of the eccentric 41.

Following the insertion of the locking elements 34 and 35 and of the guide plate 45 into the guide body, the latter is set into the housing 43 so that the opening of the slit like recess 47 is located against the inside of the housing 43, whereby the guide plate 45 is prevented from being removed therefrom. The guide body 39 itself is held by spring clips 60 arranged on its lateral surfaces and engaging the grooves (not shown) in the housing 43.

Both to aid in the introduction and to protect the hook-like stays or transverse bars 38 of the locking elements 34, 35, a strap or bracket 61 is provided on the front side of the housing 43.

Figure 7:
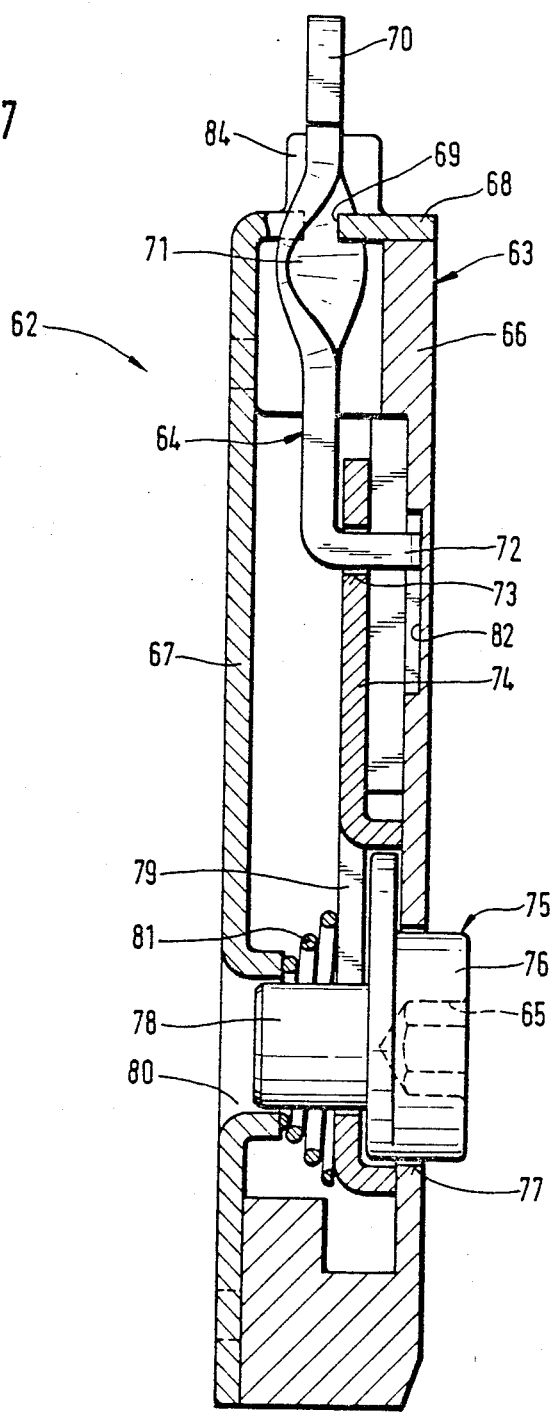
FIG. 7 is a lateral elevation of a third embodiment of a connecting element, shown partially in section similar to FIGS. 2 and 4
Figure 8:
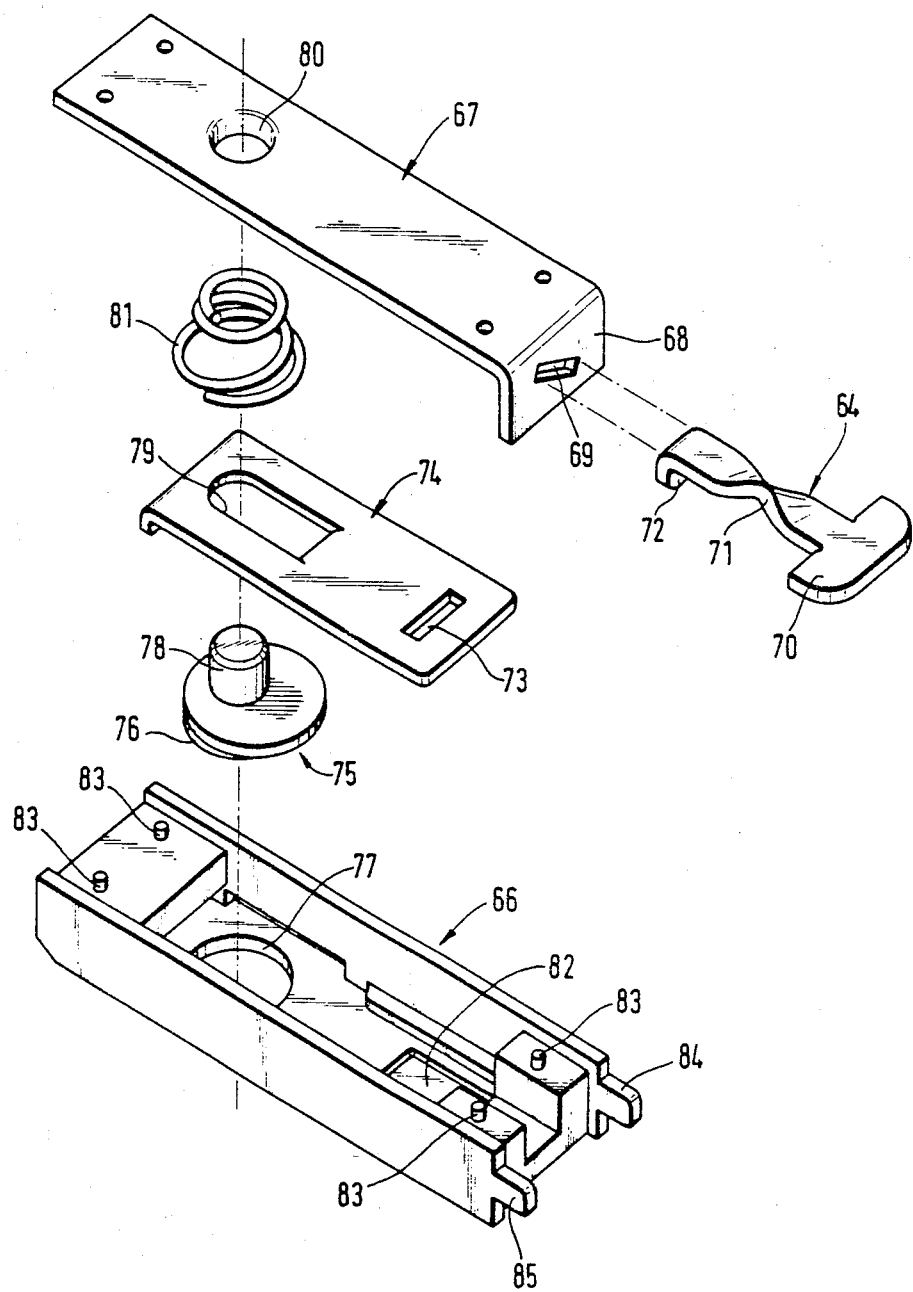
FIG. 8 is an exploded perspective view of the connecting element of FIG. 7.

FIGS. 7 and 8 show a particularly simple and lightweight embodiment of a connecting element. This connecting element 62 includes a housing 63, wherein a locking element 64 is arranged in a longitudinally displaceable manner. The housing 63 is in two parts including a base portion 66 and a cover 67. The cover 67 is angled at its front end, with the angled part 68 forming the front side of the housing 63.

In the angled part 68 of the cover 67 is provided an oblique slit 69 through which extends the single piece locking element 64. The latter has on its front end a hammer-like stay 70, followed by a symmetrically twisted segment 71. The other end of the locking element 64 consists of a hook 72 which is inserted into a slit-like opening 73 in a sliding pulling element 74.

The pulling element 74 is displaced by an eccentric 75 in the longitudinal direction of the housing 63. An eccentric head 76 of the eccentric 75 has a tool holding fixture 65 to actuate the eccentric and protrudes through an opening 77 in the bottom part 66 of the housing 63. A bearing journal 78 of the eccentric 75 located opposite the eccentric head 76 protrudes through a longitudinal opening 79 in the tension element 74 and a circular opening 80 in the cover 67. Between the tension element 74 and the cover 67 a compression spring 81 is placed around the bearing journal 78 of the eccentric 75. The eccentric head 76 may thereby be pressed in the manner of a push button into the housing.

To assure the guidance of the locking element 64 without tilting in the housing 63, an elongated recess 82 is provided in the base portion 66 for receiving the end of the hook 72. The cover 67 may be screwed together with the base portion 66 or joined thereto by other means, in particular by riveting. This is illustrated in FIG. 8 by the connecting pins 83.

In this particularly simple embodiment the locking element 64 consists of a single structural part, combining the functions of the guide rod and the drill-like rod. Rotation of the eccentric 75 moves the locking element 64 through the slit 69 in the cover 67 into the housing 63. As soon as the twisted segment 71 arrives in the area of the slit 69, the locking element 64 is rotated. The rotation of the hammer-like stay 70 on execution of a half stroke amounts to approximately 30°. Recess 82 provided in the bottom part 66 limits tilting of the hook 72 of the locking element 64.

To facilitate insertion and to protect the hammer shaped stay 70, forward projecting ledges or webs 84 and 85 project from the bottom part of the housing 63. Both the base portion 66 and the cover 67 of the housing may be made of a plastic, whereby the already light connecting element is made even lighter. But it is also possible to use plastic for the base portion 66 only, while the cover 67 may be made of sheet metal. The locking element 64 and the pulling element 74 advantageously are made of hardened spring steel.

I claim:

1. In a connecting element for releasably connecting two structural members of a stand, particularly a frame member having a hollow interior and a support member having an undercut groove, said connecting element including a housing to be positioned in a stationary manner in the hollow interior of the frame member, at least one locking element having a longitudinal axis and positioned within said housing for movement in a longitudinal direction therein, said locking element having at a first end thereof a clamping portion extending from said housing to be introduced into the undercut groove of the support member and clamped therein, and an eccentric mounted in said housing for rotation about an axis transverse to said longitudinal direction, said eccentric having a head portion to engage in a bore through a wall of the frame member to enable selective rotation of said eccentric about said transverse axis and an eccentric portion for transducing rotation of said eccentric into longitudinal movement of said locking element, the improvement comprising:

a pulling element separate from said locking element, said pulling element having a first end acting on by said eccentric portion to move said pulling element longitudinally and a second end loosely connected to a second end of said locking element such that longitudinal movement of said pulling element is transferred to said locking elements;

said locking element and said housing having cooperating means for, upon said locking element moving longitudinally, causing said clamping portion to rotate about said longitudinal axis within a limited angular range; and said clamping portion comprising a bar extending transversely of said longitudinal axis.

2. The improvement claimed in claim 1, wherein said locking element is a rod-like member.

3. The improvement claimed in claim 2, wherein said second end of said pulling element has therein a recess defining a seat into which fits said second end of said rod-like member forming said locking element.

4. The improvement claimed in claim 3, wherein said second end of said rod-like member has therein a peripheral groove into which fits said seat, such that said rod-like member is rotatable about said longitudinal axis with respect to said pulling element.

5. The improvement claimed in claim 2, wherein said cooperating means comprise a drill-like member exterior of said rod-like member, said drill-like member having exterior helical grooves, and guide means on said housing and engaging said grooves, such that upon longitudinal movement of said rod-like member, said guide means engaging said grooves constrain said drill-like member and said rod-like member to rotate about said longitudinal axis.

6. The improvement claimed in claim 5, wherein said guide means comprises a guide plate insertable into a guide body mounted in said housing, said drill-like member extending through said guide body.

7. The improvement claimed in claim 6, wherein said plate has a thickness of less than 2 mm.

8. The improvement claimed in claim 7, wherein said plate has a thickness of approximately 0.5 mm.

9. The improvement claimed in claim 6, wherein said guide body has lateral walls having locking means engaging in respective grooves in said housing.

10. The improvement claimed in claim 9, wherein said locking means comprise spring clips.

11. THe improvement claimed in claim 6, comprising plural said locking elements each including a respective said drill-like member extending through said guide body, and said second end of said pulling element is connected to second ends of all of said locking elements.

12. The improvement claimed in claim 5, wherein said clamping portion, said rod-like member, and said drill-like member are formed as a single, integral element.

13. The improvement claimed in claim 4, further comprising stop means for limiting the rotation of said rod-like member about said longitudinal axis.

14. The improvement claimed in claim 13, wherein said stop means comprises a stop sleeve mounted within said housing, and a counter stop on said rod-like member to abut said stop sleeve.

15. The improvement claimed in claim 13, wherein said stop means comprises a member at said seat to abut a counter stop on said rod-like member.

16. The improvement claimed in claim 1, wherein said bar forming said clamping portion is double-headed.

17. The improvement claimed in claim 1, wherein said cooperating means comprises a slot-like opening formed in an end of said housing, and a twisted portion formed in a mid-length region of said locking element and fitting through said slot-like opening.

18. The improvement claimed in claim 17, wherein said housing includes a base portion and a cover removably fitted on said base portion.

19. The improvement claimed in claim 18, wherein said cover includes said end having therein said slot-like opening.

20. The improvement claimed in claim 17, wherein said second end of said pulling element has therein a slot, and said second end of said locking element is bent transverse to said longitudinal axis and extends through said slot.

21. The improvement claimed in claim 20, wherein said housing has therein a longitudinal recess, and the end of said bent second end of said locking element slidingly fits in said longitudinal recess.

22. The improvement claimed in claim 1, wherein said housing has extending therefrom web-like means to protect said clamping portion.

23. The improvement claimed in claim 1, wherein said first end of said pulling element has therethrough an opening through which fits said eccentric portion, and further comprising spring means biasing said eccentric such that said heat portion thereof is retained in the bore of the frame section.

24. The improvement claimed in claim 1, wherein said cooperating means cause said clamping portion to rotate about said longitudinal axis by approximately 90°.

25. The improvement claimed in claim 1, wherein said cooperating means cause said clamping portion to rotate about said longitudinal axis by approximately 30°.

26. The improvement claimed in claim 1, wherein clamping surfaces of said transverse bar are knurled or toothed to facilitate clamping.

27. The improvement claimed in claim 1, wherein clamping surfaces of said transverse bar are inclined to facilitate clamping.

* * * * *